United States Patent [19]

Eckardt et al.

[11] 4,406,091

[45] Sep. 27, 1983

[54] APPARATUS FOR GRINDING THE EDGES OF GLASS SHEETS

[75] Inventors: Rudolf Eckardt; Hans-Cristoph Neuendorf, both of Wesel, Fed. Rep. of Germany

[73] Assignee: Flachglass Aktiengesellschaft, Gelsenkirchen, Fed. Rep. of Germany

[21] Appl. No.: 303,610

[22] Filed: Sep. 18, 1981

[30] Foreign Application Priority Data

Sep. 20, 1980 [DE] Fed. Rep. of Germany ....... 3035660

[51] Int. Cl.³ .............................................. B24B 9/10
[52] U.S. Cl. ............................. 51/101 R; 51/215 CP; 51/283 E
[58] Field of Search .............. 51/101 R, 103 C, 127, 51/215 AR, 215 HM, 215 CP, 215 H, 283 R, 283 E; 414/113, 121; 83/279, 280, 281, 251, 253

[56] References Cited

U.S. PATENT DOCUMENTS

| | | | |
|---|---|---|---|
| 2,088,737 | 8/1937 | Forbes | 51/101 R |
| 2,782,569 | 2/1957 | Robbins | 51/283 E X |
| 2,826,872 | 3/1958 | Robbins | 51/283 E X |
| 3,693,321 | 9/1972 | Nilsson | 414/121 X |
| 3,878,650 | 4/1975 | Klotzbach | 51/101 R |

FOREIGN PATENT DOCUMENTS

| | | | |
|---|---|---|---|
| 2756443 | 6/1979 | Fed. Rep. of Germany | 51/101 R |
| 1397838 | 6/1975 | United Kingdom | 51/101 R |

Primary Examiner—Robert C. Watson
Assistant Examiner—Robert P. Olszewski
Attorney, Agent, or Firm—Karl F. Ross

[57] ABSTRACT

An apparatus for grinding the edges of glass sheets comprises a device for supporting a stack of such sheets at a supply station, a table adjacent this supply station and dimensioned to support one of the sheets with its sheet edge overhanging the table, a transport carriage displaceable between the supply station and the table, and lifters on the carriage for picking up a sheet in the supply station, transporting the picked-up sheet to above the table, and for depositing the picked-up sheet on the table. The apparatus is provided with horizontally displaceable pushers on the carriage engageable with the sheet edge of a sheet on the table for horizontally displacing the sheet on the table into a predetermined position relative to the template edge. In addition the apparatus has a template underneath the table having a template edge of the shape to be imparted to the sheet on the table and a grinder displaceable around the sheet in contact with the template edge for grinding the sheet edge of a sheet on the table in accordance with the template edge.

7 Claims, 1 Drawing Figure

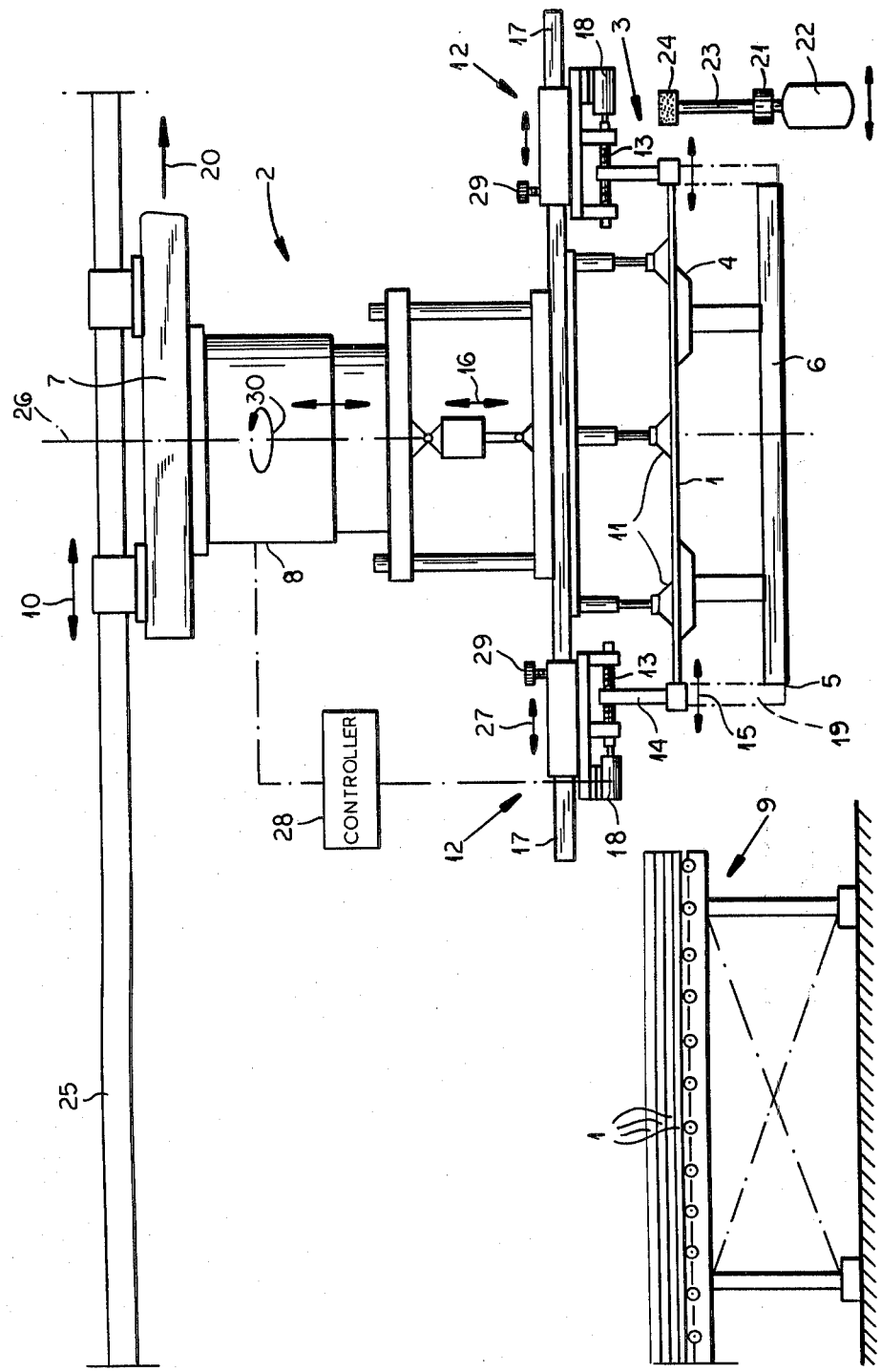

APPARATUS FOR GRINDING THE EDGES OF GLASS SHEETS

FIELD OF THE INVENTION

The present invention relates to an apparatus for grinding the edges of glass sheets. More particularly this invention concerns such an apparatus which grind-trims the sheet edges automatically in an industrial process.

BACKGROUND OF THE INVENTION

It is standard practice in the industrial production of glass sheets, that is window glass, mirrors, structural glass, or the like, to roughly cut the sheets slightly oversize, and then to grind-trim them down to exact dimensions. For this grinding the sheet is supported on a table with its sheet edges overhanging the table above a template having a template edge geometrically congruent to, and normally of the same dimensions as, the shape the sheet is to have after grinding. A grinder radially engages the edge of the sheet with a feeler in engagement with the template edge so that as the table and template are rotated about a vertical axis or the grinder is orbited about the table and template, the grinder grinds the rough-cut sheet on the table down to a size corresponding exactly to that of the template.

As a rule the rough-cut sheets are simply stacked up in a supply station adjacent the grinding station. A carriage horizontally displaceable on overhead tracks is provided with lifters, normally of the vacuum or suction type, that are dropped down onto the topmost sheet of the stack and lifted to raise it so this sheet can be transported horizontally and deposited on the work table. Such an arrangement is described in German published patent specification No. 2,756,443.

Unless the rough-cut sheets are exactly positioned in the supply station, which exact positioning is normally lost as sheets are picked off the top of the stack, and the transporter functions with great precision, normally necessitating very slow action to prevent the picked-up sheet from slipping laterally on the transporter, it is necessary for an operator in the grinding station to position the sheets exactly with respect to the template, that is to position them in vertical registration above the template. If the workpiece is horizontally offset in any direction it will be ground down too much on one edge and not at all on the opposite edge.

Such positioning is usually a manual task except in those machines where the transporter functions slowly and with enormous precision. Either way the deposition of the workpiece on the table and subsequent positioning of it robs valuable time from the production operation, time that slows down production.

OBJECTS OF THE INVENTION

It is therefore an object of the present invention to provide an improved apparatus for grinding the edges of a glass sheet.

Another object is the provision of such an apparatus which operates substantially more rapidly than the above-described arrangements.

More particularly it is an object of the invention to provide an automatic glass-sheet transporting and positioning device which operates rapidly and wholly automatically.

SUMMARY OF THE INVENTION

These objects are attained according to the instant invention in an apparatus for grinding the edges of glass sheets which comprises means for supporting a stack of such sheets at a supply station, a table adjacent this supply station and dimensioned to support one of the sheets with its sheet edge overhanging the table, a transport carriage displaceable between the supply station and the table, and lift means including lifters on the carriage for picking up a sheet in the supply station, transporting the picked-up sheet to above the table, and for depositing the picked-up sheet on the table. According to this invention the apparatus is provided with positioning means including horizontally displaceable pushers on the carriage engageable with the sheet edge of a sheet on the table for horizontally displacing the sheet on the table into a predetermined position relative to the template edge. In addition the apparatus has, as is known per se, a template underneath the table having a template edge of the shape to be imparted to the sheet on the table and grinder means displaceable guided by the template edge for grinding the sheet edge of a sheet on the table in accordance with the template edge.

Thus with the system according to the instant invention as soon as a sheet is deposited on the work table, the positioner pushers move it into the perfect position for grinding. This operation takes place in a few seconds, not appreciably slowing down the production operation, so that a transporter can be used which operates relatively rapidly so that it is unable by itself precisely to position the workpiece on the work table. In fact the short time it takes the pushers to properly position the sheet on the table is normally substantially much less than the time that can be saved on each operation by using a fairly rapid transporter, so a net time saving is realized.

According to this invention the carriage has a plurality of horizontal positioning arms along each of which a respective such pusher is displaceable. Normally one such pusher is provided for each side of the template, that is four for a rectangular template, five for a pentagonal one, and so on.

The positioning means according to this invention includes a motor connected to each of the pushers. These motors are part of each positioning assembly and are all operated by the controller that synchronizes the transporting and grinding operations.

The pushers can be formed as downwardly projecting fingers which may be vertically displaceable to be engageable with the template edge, or may be provided with downward extensions engageable with the template edge. Thus the predetermined position into which the sheet is shifted on the work table will be in vertical registration with the template.

The lifters according to this invention are vacuum lifters and at least two of the lifters are horizontally oppositely engageable with the sheet edge of a sheet on the table With the system according to the instant invention it is merely necessary to set the positioner pushers on the template at the start of a production run, and thereafter the sheets are automatically positioned immediately after they are deposited. Thus if the sheets are not neatly stacked in the supply station, or shift on the transporter while en route to the work table, the positioners reposition them perfectly. This integration of the positioning function in the transporter gives considerable advantages over any prior-art system. In particular the machine according to this invention can operate extremely rapidly.

DESCRIPTION OF THE DRAWING

The above and other features and advantages will become more readily apparent from the following, reference being made to the accompanying drawing whose sole FIGURE is a side and partly schematic view of the apparatus according to the instant invention.

SPECIFIC DESCRIPTION

As seen in the drawing a stack of rough-cut glass sheets 1 lies atop a supply table 9 at a supply station. A transporter 2 picks up these sheets 1 one at a time and carries them to a grinding station 3 having a work table 4. A template 6 is fixed underneath this table 4 and has a template edge 5 which has the shape the glass sheets 1 are to be ground down to. A grinding wheel 24 carried on a shaft 23 of a motor 22 can move radially relative to a vertical axis 26 about which the table 4 and template 6 are rotatable, with a roller 21 on the shaft 23 engaging the periphery 5 to guide the grinding wheel 24.

The transporter 2 has a carriage 7 displaceable horizontally as indicated by double-headed arrow 10 on tracks 25 between a position above the table 9 and a position above the table 4. This carriage 7 has a compressed-air cylinder 8 effective along a vertical axis 26 as indicated by double-headed arrow 16. Horizontal arms 17 and suction lifters 11 are hung from the cylinder 8. The lifters 11 are of standard design and are connected to a vacuum arrangement so that when they are lowered down onto a sheet 1 they adhere to it with sufficient force that when raised they lift the sheet, only releasing it when the suction is cut.

The outer ends of the arms 17 which are formed as rails which extend perpendicular to each straight side edge of the template 6 and which carry positioners 12 which are displaceable along these arms 17 as indicated by arrow 27. Each of these positioners in turn has a downwardly extending finger or positioning arm 14 engageable with the sheet edge and itself carried on a threaded spindle 13 constituting the output shaft of a respective electric motor 18. Thus these pusher fingers 14 can be moved by the respective motors 18 as shown by arrow 15.

In the illustrated arrangement the carriage 7 itself moves with great precision so that each time it comes to rest above the table 4 it is in an exactly determined position. The positions of the sheets 1 on the supply table 9 cannot be so accurately determined, and it is possible for the sheets 1 to shift slightly horizontally relative to the carriage 7 while being picked up, transported, and deposited.

The motors 18 are controlled by standard limit switches to move the respective pusher fingers 14 inwardly to predetermined positions on the respective spindles 13 and then to stop before the controller 28 reverses them and moves the pushers 14 back into the outer positions. Thus at the start of a production run with a given template 6 the pushers 14 are moved into the inner positions shown in the drawing and then the entire devices 12 are moved so that these pushers 14 lie exactly above the respective edges of the template 6, in which positions they are locked in place as for example by screws 29.

Thereafter the pushers 14 are moved into their outer positions, in which they are held as the carriage 7 moves upstream to pick up a sheet and in which they remain until the carriage 7 has moved downstream and deposited the picked-up sheet 1 on the table 4. The controller 28 then operates the motors 18 to move the pushers 14 to their inner positions, which as described above have been set to correspond to the template edge 5. This action perfectly aligns the workpiece on the table 4 with the template 5. Normally the table 4 incorporates suction holders which are actuated once the sheet 1 is properly positioned to hold the deposited sheet 1 firmly in place. In addition this table 4 and the template 6 are normally rotatable about the axis 26 as indicated by the arrow 30 during the grinding operation, so that the grinder 21–24 need merely move radially relative to the axis 26. Details of the grinding operation are given in our jointly filed and copending application Ser. No. 06/303,625, to which reference should be made for more information.

After the sheet 1 is completely ground it is transported away in the direction indicated by arrow 20. This can be done by the same transporter 2 that brings it to the table 4, by another independent transporter, or by a transporter connected to the transporter 2 and displaceable jointly therewith.

It is also possible to provide the fingers 14 with downward extensions 19 that engage the template edge 6. With such an arrangement the setting described above is not necessary. Instead the motors 18 merely slip when the extensions 19 engage the edge 5.

Thus the system according to this invention automatically aligns the sheet to be ground down with the template. This positioning takes place after the sheet has been deposited on the grinding table, so that the transport can be carried out relatively rapidly, as shifting of the sheet on the transporter does not create problems.

We claim:

1. Apparatus for grinding the edges of glass sheets, said apparatus comprising:
   means for supporting a stack of such sheets at a supply station;
   a table adjacent said supply station and dimensioned to support one of said sheets with its sheet edge overhanging said table;
   a transport carriage displaceable between said supply station and said table;
   lift means including lifters on said carriage for picking up a sheet in said supply station, transporting the picked-up sheet to above said table, and for depositing the picked-up sheet on said table;
   positioning means including horizontally displaceable pushers on said carriage engageable with the sheet edge of a sheet on said table for horizontally displacing the sheet on said table into a predetermined position relative to said template edge;
   a template underneath said table having a template edge of the shape to be imparted to a sheet on said table; and
   grinder means displaceable around said table in contact with said template edge for grinding the sheet edge of a sheet on said table in accordance with said template edge.

2. The apparatus defined in claim 1 wherein said carriage has a plurality of horizontal positioning arms along each of which a respective such pusher is displaceable.

3. The apparatus defined in claim 2 wherein the positioning means includes a motor connected to each of said pushers.

4. The apparatus defined in claim 3 wherein said pushers are formed as downwardly projecting fingers.

5. The apparatus defined in claim 3 wherein said pushers are horizontally engageable with said template edge, said predetermined position being in general vertical registration with said template.

6. The apparatus defined in claim 1 wherein said lifters are vacuum lifters.

7. The apparatus defined in claim 2 wherein at least two of said lifters are horizontally oppositely engageable with the sheet edge of a sheet on said table.

* * * * *